United States Patent
Zhao

(10) Patent No.: US 8,917,856 B2
(45) Date of Patent: Dec. 23, 2014

(54) CALL CENTER SYSTEM AND CALL SERVICE IMPLEMENTATION METHOD THEREOF

(75) Inventor: Chunhui Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,396

(22) PCT Filed: Dec. 21, 2009

(86) PCT No.: PCT/CN2009/075781
§ 371 (c)(1),
(2), (4) Date: Nov. 24, 2011

(87) PCT Pub. No.: WO2010/145148
PCT Pub. Date: Dec. 23, 2010

(65) Prior Publication Data
US 2012/0114113 A1 May 10, 2012

(30) Foreign Application Priority Data
Jun. 19, 2009 (CN) .......................... 2009 1 0147763

(51) Int. Cl.
*H04M 3/00* (2006.01)
*H04M 3/51* (2006.01)
*H04M 3/42* (2006.01)

(52) U.S. Cl.
CPC ........ *H04M 3/5191* (2013.01); *H04M 3/42382* (2013.01); *H04M 3/5141* (2013.01); *H04M 2203/4536* (2013.01)
USPC ............ 379/265.09; 379/266.01; 379/266.03; 379/266.09

(58) Field of Classification Search
USPC ................. 379/265.09, 266.04, 309, 266.02, 379/88.13, 266.01, 266.03, 266.09; 709/204–206
See application file for complete search history.

(56) References Cited

U.S. PATENT DOCUMENTS

2001/0016873 A1* 8/2001 Ohkado et al. ................ 709/205
(Continued)

FOREIGN PATENT DOCUMENTS

CN 1474588 A 2/2004
(Continued)

OTHER PUBLICATIONS

Supplementary European Search Report in European application No. 09846062.9, mailed on Dec. 13, 2012.
(Continued)

*Primary Examiner* — Duc Nguyen
*Assistant Examiner* — Yosef K Laekemariam
(74) *Attorney, Agent, or Firm* — Oppedahl Patent Law Firm LLC

(57) ABSTRACT

The present invention discloses a call center system and a call service implementation method thereof, wherein in the system, a Web access device is used for logging on an instant messaging server based on an instant messaging access of a user and sending instant messaging queuing information to a Computer Telephony Integration (CTI), and initiating an instant messaging request to a seat after receiving queuing result information returned by the CTI; the CTI is used for returning the queuing result information to the Web access device according to the received instant messaging queuing information and sending a Web access service beginning message to the seat; and the seat is used for accepting the instant messaging request initiated by the Web access device according to the received Web access service beginning message and performing an instant messaging. The call center system and the call service implementation method thereof provided by the present invention combines the interaction of the voice access and the operation of network access instant messaging, perfecting the call center system with a single manner of the voice access.

11 Claims, 2 Drawing Sheets

(56) References Cited

U.S. PATENT DOCUMENTS

| | | | |
|---|---|---|---|
| 2005/0111653 A1* | 5/2005 | Joyce et al. | 379/265.09 |
| 2005/0141694 A1* | 6/2005 | Wengrovitz | 379/265.09 |
| 2005/0187781 A1 | 8/2005 | Christensen | |
| 2006/0080130 A1* | 4/2006 | Choksi | 705/1 |
| 2006/0143271 A1* | 6/2006 | Murphy et al. | 709/206 |
| 2008/0052377 A1* | 2/2008 | Light | 709/218 |
| 2008/0205630 A1 | 8/2008 | Deshpande | |
| 2008/0267387 A1* | 10/2008 | Strathmeyer et al. | 379/265.09 |
| 2009/0028132 A1 | 1/2009 | Portman | |
| 2009/0086957 A1* | 4/2009 | Kelley et al. | 379/265.09 |

FOREIGN PATENT DOCUMENTS

| | | |
|---|---|---|
| CN | 1725689 A | 1/2006 |
| CN | 1960344 A | 5/2007 |
| CN | 101079928 A | 11/2007 |
| CN | 101478612 A | 7/2009 |
| EP | 1569397 A2 | 8/2005 |

OTHER PUBLICATIONS

International Search Report in international application No. PCT/CN2009/075781, mailed on Apr. 1, 2010.

English Translation of the Written Opinion of the International Search Authority in international application No. PCT/CN2009/075781, mailed on Apr. 1, 2010.

* cited by examiner

CALL CENTER SYSTEM AND CALL SERVICE IMPLEMENTATION METHOD THEREOF

TECHNICAL FIELD

The present invention relates to the field of communication technologies, and in particular to a call center system and a call service implementation method thereof.

BACKGROUND

At present, a call center system with a Computer Telephony Integration (CTI) technology as core is widely applied to various public service industries, including public institutions such as telecommunication operators, banks, civil/public affairs administrative government units and water/electricity/gas supply units, and enterprises such as the large-scale terminal goods retail enterprises. The call center system with the CTI technology as core is a main service means adopted by the related enterprises and the public institutions which need to handle services for a large number of customers, including service consultation, data query, fault declaration, complaint suggestion, technical support and the like, and has a wide range of application. The system framework of the call center system above is as shown in FIG. 1, including: a CTI, a soft switch, an intelligent network Service Switch Point (SSP), a seat module, a Session Initiation Protocol (SIP) soft telephone or a Public Switched Telephone Network (PSTN) conventional telephone; wherein the CTI is a core module of the conventional call center framework; the soft switch is a core device of the telecommunication network, for finishing the control and processing function of the whole call flow and meanwhile controlling the connection and disconnection of a speech path bearer network; the intelligent network SSP is a service access point of the intelligent network, i.e., a middle point between the intelligent network and the soft switch, for processing interaction between the intelligent network and the soft switch; the seat module is an interface module by which the seat interacts with the CTI, and communicates with the CTI by applying the standard Telephony Service Application Programming Interface (TSAPI) protocol and expansion thereof and can be called by a seat program in a form of control such as ActiveX control; the SIP soft telephone or the PSTN conventional telephone is a communicating device of the seat, and is a common PSTN conventional telephone set if corresponding to a conventional PSTN telephone network, and can be a software analog telephone registered with the soft switch using SIP protocol through Internet Protocol (IP) bearer if corresponding to a Next Generation Network (NGN) broadband network.

In the system above, the work flow of modules collaborating with each other is as follows: a user accesses, through a telecommunication network access device, a conventional PSTN telephone network or a new NGN broadband telecommunication network, and calls the core device of the telecommunication network, i.e., the soft switch; the soft switch corresponds to the switch of the conventional network and then transfers to the corresponding intelligent network SSP to perform processing according to the intelligent network services corresponding to the soft switch; the SSP informs the CTI of call information; and then the CTI performs a queuing processing and obtains an idle seat for communicating with the user; wherein the new NGN broadband telecommunication network performs communication using a broadband communication protocol such as IP/SIP through the IP bearer or an Asynchronous Transfer Mode (ATM) bearer. The call center is a typical intelligent network service.

However, at present, the call center system is basically merely limited to perform an access in the manner of voice of a telephone network, with a single interactive method; when performing some complicated operations, the operations are much cumbersome; besides, there is also an access service method in which an access is performed through a network; however, this method is generally only limited to the self-service of a user at present, generally lacking interactive communication with customer service representatives, let alone other extensibility applications such as video conference, white board, remote assistance and the like.

SUMMARY

Certain embodiments of the present invention provide a call center system and a call service implementation method thereof to solve the problem of the single manner of voice access and complicated operations in the related art.

An embodiment of the present invention provides a call center system, which comprises: a Web access device, an instant messaging server, a Computer Telephony Integration (CTI) and a seat, wherein the Web access device is arranged to log on the instant messaging server based on an instant messaging access of a user, send instant messaging queuing information to the CTI, and initiate, after receiving queuing result information returned by the CTI, an instant messaging request to the seat;

the CTI is arranged to return the queuing result information to the Web access device according to the received instant messaging queuing information and send a Web access service beginning message to the seat; and the seat is arranged to accept the instant messaging request initiated by the Web access device according to the received Web access service beginning message, and perform an instant messaging.

Wherein the instant messaging queuing information may comprise an instant messaging account of the user, and/or seat skills required;

the queuing result information may comprise an instant messaging account allocated to the seat by the CTI according to the received instant messaging queuing information; and the Web access service beginning message may comprise an instant messaging account of the user.

Preferably, the call center system according to the embodiment of the present invention may further have the following characteristics:

the Web access device is further arranged to initiate a session call access request to the seat based on a session call access of a user and send call queuing information to the CTI, wherein the call queuing information comprises the call number of the user;

the CTI is further arranged to allocate an idle seat to the user according to the call queuing information; and the seat is further arranged to accept the session call access request sent by the Web access device via a soft switch and an intelligent network SSP, and perform a session.

Preferably, the seat may be further arranged to notify the CTI to set the state of the seat being in service after accepting the instant messaging request or the session call access request; and the CTI may be further arranged to refuse other access requests of accessing the seat when the state of the seat is in service.

The call center system according to the embodiment of the present invention may further comprise:

a network queuing device, arranged to forward a message between the Web access device and the CTI, wherein the message comprises the instant messaging queuing information, the call queuing information and the queuing result information.

Preferably, the CTI may be further arranged to return, when determining that the user obtains a service authorization according to the received instant messaging queuing information, the queuing result information to the Web access device and send the Web access service beginning message to the seat; and the seat may be further arranged to receive the instant messaging request initiated by the Web access device, compare the instant messaging request with the Web access service beginning message sent by the CTI, if it is indicated that the instant messaging request is a legitimate message by comparison, accept the instant messaging request and perform the instant messaging; otherwise, return a rejection message.

An embodiment of the present invention further provides a call service implementation method in a call center system, which comprises:

a Web access device logs on an instant messaging server based on an instant messaging access operation of a user and sends instant messaging queuing information to a CTI;

the CTI returns queuing result information to the Web access device according to the received instant messaging queuing information and sends a Web access service beginning message to a seat;

the Web access device initiates an instant messaging request to the seat according to the received queuing result information; and the seat accepts the instant messaging request according to the Web access service beginning message and performs an instant messaging.

Wherein the instant messaging queuing information may comprise an instant messaging account of the user, and/or seat skills required;

the queuing result information may comprise information of an instant messaging account allocated to the seat by the CTI according to the received instant messaging queuing information; and the Web access service beginning message may comprise an instant messaging account of the user.

Preferably, the step that the CTI sends the Web access service beginning message to the seat may further comprise: the CTI, when determining that the user obtains a service authorization according to the received instant messaging queuing information, returns the queuing result information to the Web access device and sends the Web access service beginning message to the seat.

Preferably, the step that the seat accepts the instant messaging request and performs the instant messaging may comprise: the seat receives the instant messaging request initiated by the Web access device, compares the instant messaging request with the Web access service beginning message sent by the CTI, if it is indicated that the instant messaging request is a legitimate message by comparison, accepts the instant messaging request and performs the instant messaging; and the method may further comprise: if it is indicated that the instant messaging request is not a legitimate message by comparison, the seat returns a rejection message.

Preferably, after the seat accepts the instant messaging request and performs the instant messaging, the method may further comprise:

the seat notifies the CTI to set the state of the seat being in service after accepting the instant messaging request; the CTI refuses other access requests of accessing the seat.

Compared with the related art, the embodiments of the present invention have the following advantages:

the call center system according to the embodiments of the present invention, compared with the existing call center system with the single manner of voice communication, greatly improves the interaction between the customer service representative and the user; meanwhile, for some application fields, such as using a remote assistance function to help a user to solve a computer fault and using a white board to draw a simple map, and guiding the user how to reach a designated place and so on, the communication effect is obviously improved and the experience of the user is greatly improved compared with the single manner of the voice communication. Besides, the instant messaging tools existing in the internet can be utilized to combine with the existing call center platform system to achieve low-cost function improvement. Furthermore, compared with the communication method which directly adopts an instant messaging tool, the call center according to the embodiments of the present invention, in which the sessions of both the user and seat representative are under the control of the call center platform, inherits queuing and allocation which are performed according to the skills and idle condition of the customer service representatives of the call center platform, and the management functions such as authority control, data statistics, quality monitoring, communication recording, service feedback valuation, and can provide a support for massive telephone traffic.

DETAILED DESCRIPTION

The technical solutions of the embodiments of the present invention will be described clearly and completely in conjunction with the accompanying drawings of the embodiments of the present invention; obviously, the embodiments described are only part of embodiments of the present invention rather than all of the embodiments. Based on the embodiments of the present invention, all the other embodiments obtained by those skilled in the art without making creative work should be deemed to be within the protection scope of the present invention.

The embodiments of the present invention provide a call center system and a call service implementation method thereof to solve the problems of the single manner of voice access and complicated operations in the related art.

The call center system according to the embodiments of the present invention combines the advantages of both the interaction of the voice access and the operation convenience, intuition and diversification of the network access instant messaging, thereby further perfecting the call center system with voice access as the single access manner in the related art; so that a user can access a seat of the call center through the Internet network and communicate with a seat customer service representative in more richer interactive manners such as online chat including text chat, video chat and audio chat, white board, application program share, remote assistance and even video conference.

Meanwhile, the call center system according to the embodiments of the present invention is managed based on the call center platform, and is different from the network point-to-point instant messaging system which is not controlled by the centralized platform (like the present QQ, MSN and the like); the call center system according to the embodiments of the present invention inherits queuing and allocation which are performed according to the skills and idle condition of the customer service representatives of the call center platform, and the management functions such as authority management, data statistics, quality monitoring, communication recording, service feedback valuation, and can provide a support for massive telephone traffic.

Figure 1:
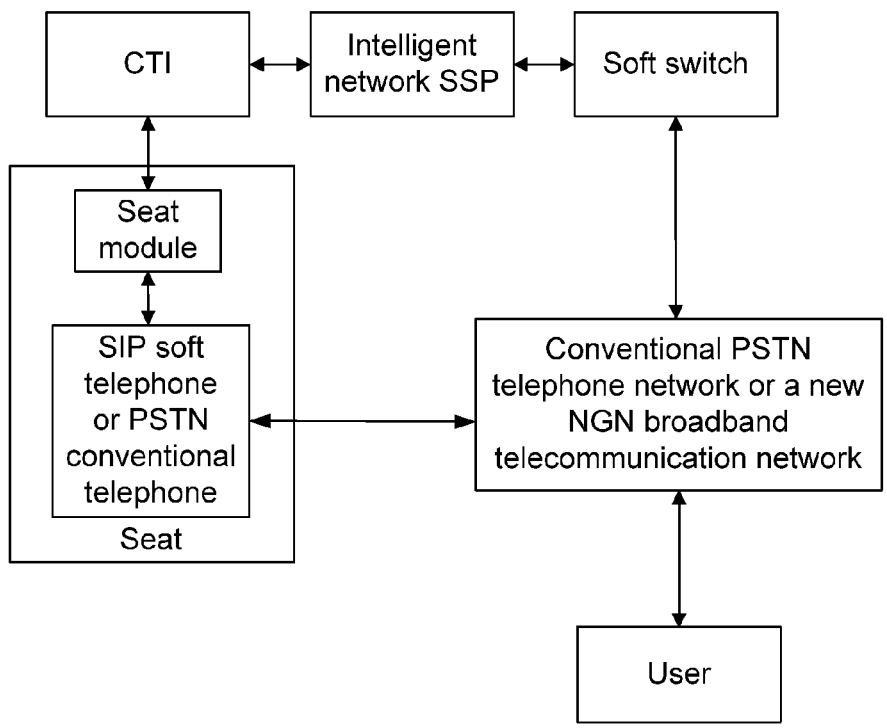
FIG. 1 shows a structure diagram of a call center system in the related art.
Figure 2:
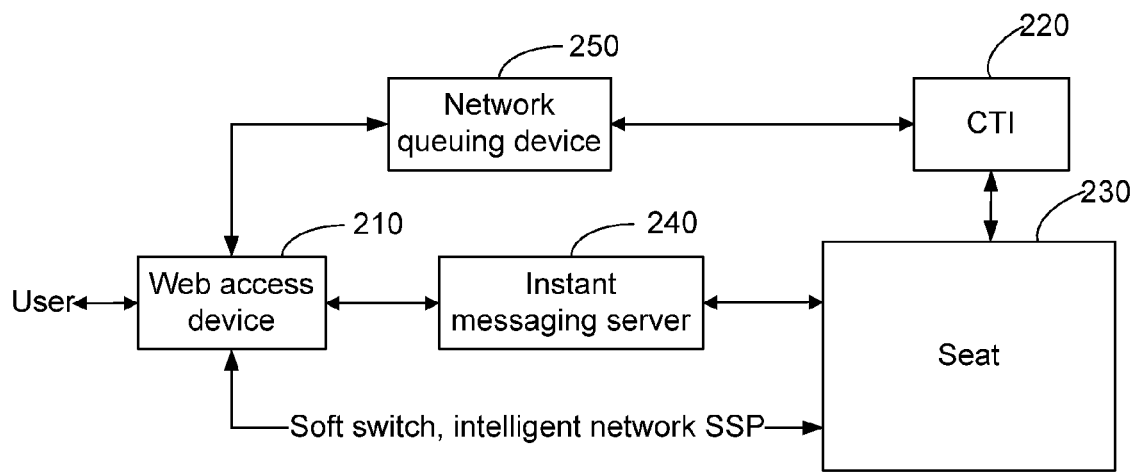
FIG. 2 shows a structure diagram of a call center system according to an embodiment of the present invention.

An embodiment of the present invention provides a call center system, as shown in FIG. 2, which comprises: a Web access device 210, a CTI 220, a seat 230 and an instant messaging server 240; wherein the Web access device 210 is used for logging on the instant messaging server 240 based on the instant messaging access operation of a user, and sending instant messaging queuing information to the CTI 220 and initiating, after receiving queuing result information returned by the CTI 220, an instant messaging request to the seat 230;

the CTI 220 is used for returning the queuing result information to the Web access device 210 according to the received instant messaging queuing information and sending a Web access service beginning message to the seat 230; and the seat 230 is used for accepting the instant messaging request initiated by the Web access device 210 according to the Web access service beginning message and performing the instant messaging.

Wherein the instant messaging queuing information comprises an instant messaging account of a user and/or seat skills required; the queuing result information comprises an instant messaging account allocated to the seat by the CTI 220 according to the received instant messaging queuing information; and the Web access service beginning message comprises an instant messaging account of the user.

Preferably, the Web access device 210 is further used for initiating a session call access request to the seat 230 based on the session call access operation of the user and sending call queuing information to the CTI 220, wherein the call queuing information includes the call number of the user.

The CTI 220 is further used for allocating an idle seat to the user according to the call queuing information.

The seat 230 is further used for accepting the session call access request sent by the Web access device 210 via a soft switch and an intelligent network, and performing a session.

Preferably, the seat 230 is further used for sending state information of being in access service to the CTI 220 after accepting the instant messaging request or the session call access request.

The CTI 220 is further used for refusing other access requests of accessing the seat after receiving the state information of being in access service.

Preferably, the CTI 220 determines whether the user obtains a service authorization according to the received instant messaging queuing information, and, if yes, the CTI 220 returns the queuing result information to the Web access device 210 and sends a Web access service beginning message to the seat 230.

The seat 230 receives the instant messaging request initiated by the Web access device 210, and compares the instant messaging request with the Web access service beginning message sent by the CTI 220, and, if it is indicated that the instant messaging request is a legitimate message by comparison, accepts the instant messaging request and performs the instant messaging; otherwise, the seat 230 returns a rejection message.

The call center system according to the embodiment of the present invention further comprises a network queuing device 250 used for forwarding a message between the Web access device 210 and the CTI 220, wherein the message comprises the instant messaging queuing information, the call queuing information and the queuing result information.

The call center system according to the embodiments of the present invention, compared with the existing call center system with single manner of voice communication, greatly improves the interaction between the customer service representative and the user, so that after the instant messaging between the user and the seat representative is established, both the user and the seat representative can continue to initiate other services such as video chat, video conference, remote assistance and the like which are supported by the instant messaging system. The interaction process greatly improves the communication effect and the user's experience.

The specific implementation of the system according to the embodiments of the present invention will be illustrated in detail with reference to a preferred embodiment.

System Embodiment

Figure 3:
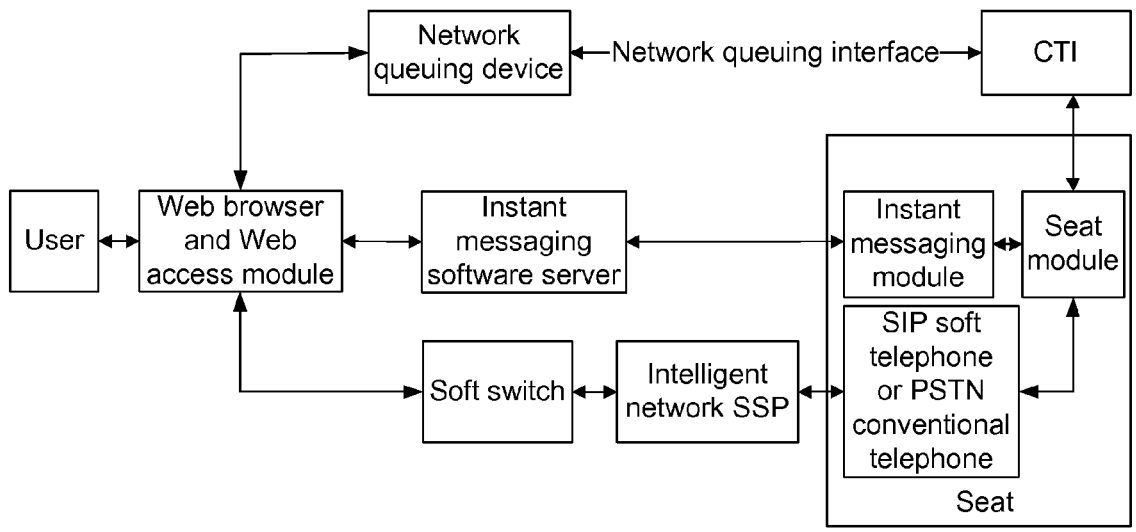
FIG. 3 shows a structure diagram of a call center system according to an embodiment of the present invention.

The structure diagram of the system according to the embodiment of the present invention is as shown in FIG. 3, and all modules included in the embodiment are as follows:

a Web browser, which is an internet browser in the terminal computer of a user, such as Internet Explorer and the like;

a Web access module, which is a module for the Web browser to call, can be embedded into the Web browser in a control manner and provides an interface to be connected with the network queuing device through a Web; and provides an interface used for a multimedia interaction with a seat through the Web, wherein the multimedia interaction comprises functions such as text chat, voice chat, video chat, white board, application program share, remote assistance, video conference and the like which can be provided by the instant messaging system; of course, the embodiment of the present invention is not limited to the above-mentioned function types listed; it should be illustrated that the above Web browser and the Web access module together accomplish the function of the Web access device 210;

a network queuing device, which is a network queuing interface used for providing a connection to the CTI for a seat queuing;

an instant messaging server, which is a network server for providing instant messaging service, can be either an existing public instant messaging system, such as QQ and MSN, or a self-developed instant messaging system;

a CTI, which is a core module of the conventional call center framework;

a soft switch, which is a core device of a telecommunication network, for finishing the control and processing function of the whole call flow and meanwhile controlling the connection and disconnection of a speech path bearer network;

an intelligent network SSP, which is a middle point between the intelligent network and the soft switch, for processing the interaction between the intelligent network and the soft switch; and the seat is divided into three parts, comprising: an instant messaging module, used for communicating with the instant messaging server; a seat module, used for communicating with the CTI; and a telephone device with an SIP software telephone or a PSTN conventional telephone as a seat, which is a seat device used for performing communication between the seat representative and the user.

Preferably, the call center system according to the embodiment of the present invention is divided into three basic systems, comprising:

an online access queuing system which is connected to the CTI through the network queuing interface between the network queuing device and the CTI; an instant messaging system based on the instant messaging server; and a call center customer service platform system based on the soft switch, the intelligent network SSP, the SIP soft telephone and the seat module.

The above-mentioned three basic systems are independent from each other and can be combined flexibly and organically, for example, an instant messaging system existing in the Internet can be combined with an original call center platform; or a self-developed instant messaging system can be combined with a call center platform.

For clearly describing the specific work process of the call center system according to the embodiment of the present invention, the specific operation flow of the call center system according to the embodiment in practical application will be illustrated in detail by a typical flow of an online chat which is performed through a Web being accessed to the call center system, wherein the flow comprises the following steps:

(1) a user logs on an Instant Messaging system Server (IMServer) using his/her own instant messaging system account and a Web access module embedded into the Web browser;

(2) the user is connected to the network queuing device through the Web access module, transmits instant messaging queuing information to the CTI to queue through the internet connection and waits queuing result information to be returned by the CTI; wherein the instant messaging queuing information comprises information of the instant messaging system account of the user, information of seat skills required by the user, i.e., what services the seat can provide; the instant messaging queuing information can be transmitted by a Hyper Text Transfer Protocol (HTTP) tunnel technology;

(3) the CTI determines whether the user has obtained an authorization of the service and whether the current system supports the Web access method according to the instant messaging queuing information, if yes, an instant messaging account of a seat customer service representative who is in idle state and supports the service skill will be allocated, the instant messaging account will be displayed to the user as the queuing result information through the network queuing device, the Web access module and the Web browser in turn; and the CTI sends a Web access service beginning message to the seat module in the seat while returning the queuing result information, wherein the message corresponds to the instant messaging account of the user;

(4) the Web access module initiates an instant messaging request to the instant messaging module in the seat according to the instant messaging account in the queuing result information returned by the CTI; the instant messaging module in the seat forwards the request message to the seat module after receiving the request; and the seat module notifies the instant messaging module to accept the instant messaging request after determining that the instant messaging request is legitimate;

wherein the determining criteria of the seat module is: comparing the Web access service beginning message sent by the CTI with the instant messaging request sent by the instant messaging module, and, if it is indicated that the instant messaging request is a legitimate message by comparison, notifying the instant messaging module to accept the instant messaging request;

(5) after accepting the session request, the seat notifies the CTI to set the state of the seat being in service through the seat module; the CTI refreshes the state of the seat, does not accept other access requests of accessing the seat any longer and notifies other modules such as a log server of the call center platform to perform corresponding processing, such as recording a service log, a session start time and the like;

(6) the user and the seat then can begin an online chat directly with their accounts in the instant messaging system as identifiers; and (7) the user and the seat can further initiate other extended services supported by the instant messaging system, such as video chat, video conference, white board, application program share, remote assistance and the like; the customer service representatives can serve the accessed users by various interaction modes.

The above process is the process that a user initiates the instant messaging request to a seat; the session access process of the system will be described briefly below:

(1) the Web access module initiates a session call access request to the seat based on the session call access operation of a user, and sends the CTI call queuing information of the user including the call number of the user; wherein the Web access module preferably sends the session call access request to the seat through the soft switch and the intelligent network SSP;

(2) the CTI allocates an idle seat to the user according to the received call queuing information;

(3) after the CTI allocates the idle seat, the seat accepts the session call access request sent by the Web access module via the soft switch and the intelligent network SSP, and performs a session; and (4) after accepting the session call access request, the seat notifies the CTI to set the state of the seat being in service, the CTI refuses other access requests of accessing the seat.

The call center according to the embodiment of the present invention, compared with the existing call center platform with the single manner of voice communication, greatly improves the interaction between the customer service representatives and the user. Meanwhile, for some application fields, such as using a remote assistance function to help a user to solve a computer fault and using a white board to draw a simple map, and guiding the user how to reach a designated place and so on, the communication effect is obviously improved and the experience of the user is greatly improved compared with the single manner of the voice communication. Besides, the instant messaging tools existing in the internet can be utilized to combine with the existing call center platform system to achieve low-cost function improvement. Furthermore, compared with the communication method which directly adopts an instant messaging tool, the advantages of the solution of the embodiment of the present invention are that: the sessions of both the user and the customer service representative are under the control of the call center platform, inheriting queuing and allocation which are performed according to the skills and idle condition of the customer service representatives of the call center platform, and the management functions such as authority control, data statistics, quality monitoring, communication recording, service feedback valuation, and a support for massive telephone traffic can be provided.

Method Embodiment

Figure 4:
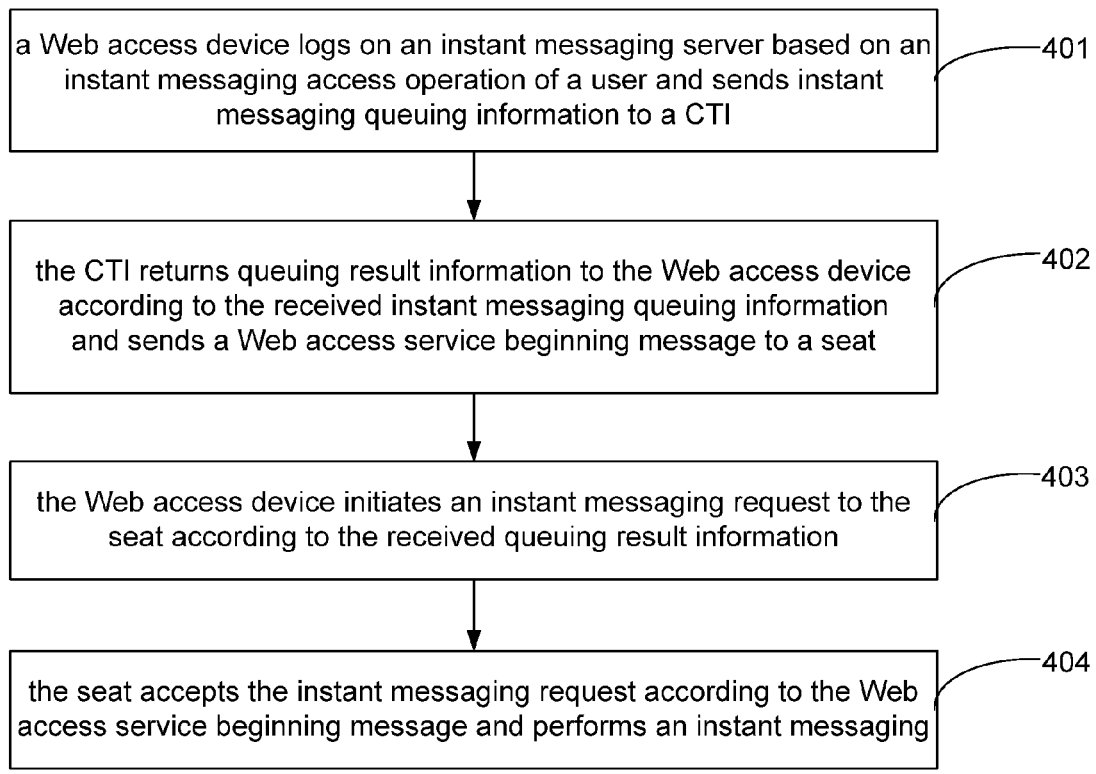
FIG. 4 shows a flowchart of a call service implementation method in the call center system according to an embodiment of the present invention.

An embodiment of the present invention further provides a call service implementation method in the call center system, as shown in FIG. 4, and the method of the embodiment comprises the following steps that:

step 401: a Web access device logs on an instant messaging server based on an instant messaging access operation of a user, and sends instant messaging queuing information to a CTI;

wherein the instant messaging queuing information comprises an instant messaging account of the user and/or seat skills required;

step 402: the CTI returns queuing result information to the Web access device according to the received instant messaging queuing information, and sends a Web access service beginning message to a seat;

wherein the queuing result information comprises information of an instant messaging account allocated to a seat by the CTI according to the received instant messaging queuing information; the Web access service beginning message comprises the instant messaging account of the user;

preferably, in step 402, the CTI determines whether the user obtains a service authorization according to the received instant messaging queuing information, and, if yes, the CTI returns the queuing result information to the Web access device and sends a Web access service beginning message to the seat;

step 403: the Web access device initiates an instant messaging request to the seat according to the received queuing result information; and step 404: the seat accepts the instant messaging request according to the Web access service beginning message and performs an instant messaging;

preferably, in step 404, the seat receives the instant messaging request initiated by the Web access device, compares the instant messaging request with the Web access service beginning message sent by the CTI, and, if it is indicated that the instant messaging request is a legitimate message by comparison, accepts the instant messaging request and performs the instant messaging; otherwise, the seat returns a rejection message;

after step 404, the following step is further performed: the seat notifies the CTI to set the state of the seat being in service after accepting the instant messaging request, at this moment, the CTI refuses other access requests of accessing the seat.

The call service implementation method in the call center system according to embodiments of the present invention, compared the call service method with the single manner of voice communication in the existing call center system, greatly improves the interaction between the customer service representative and the user; after the instant messaging between the user and the seat representative is established, both the user and the seat representative can continue to initiate other services such as video chat, video conference, remote assistance which are supported by the instant messaging system. The interaction process greatly improves the communication effect and the user's experience.

Obviously, those skilled in the art can make various changes and modifications to the present invention without departing from the spirit and the scope of the present invention. So, if the changes and modifications made to the present invention belong to the scope of the claims of the present invention or the equivalent technologies of the present invention, the changes and modifications are further deemed to be included in the present invention.

The invention claimed is:

1. A call center system, comprising: a Web access device, an instant messaging server, a Computer Telephony Integration (CTI), and a seat, wherein the Web access device being arranged to log on the instant messaging server based on an instant messaging access of a user, send instant messaging queuing information to the CTI, and initiate, after receiving queuing result information returned by the CTI, an instant messaging request to the seat;

the CTI being arranged to return the queuing result information to the Web access device according to the received instant messaging queuing information and send a Web access service beginning message to the seat;

the seat being arranged to accept the instant messaging request initiated by the Web access device according to the received Web access service beginning message, perform an instant messaging, and initiate extended services supported by the instant messaging server, the extended services including video chat, video conference, white board, application program share and remote assistance; and the call center system further comprises a network queuing device, the network queuing device is arranged to forward a message between the Web access device and the CTI, wherein the message comprises the instant messaging queuing information and the queuing result information.

2. The system according to claim 1, wherein the instant messaging queuing information comprises an instant messaging account of the user, and/or seat skills required;

the queuing result information comprises an instant messaging account allocated to the seat by the CTI according to the received instant messaging queuing information; and the Web access service beginning message comprises an instant messaging account of the user.

3. The system according to claim 1, wherein the Web access device is further arranged to initiate a session call access request to the seat based on a session call access of a user and send a call queuing information to the CTI, wherein the call queuing information comprises the call number of the user;

the CTI is further arranged to allocate an idle seat to the user according to the call queuing information; and the seat is further arranged to accept the session call access request sent by the Web access device via a soft switch and an intelligent network Service Switch Point (SSP), and perform a session.

4. The system according to claim 3, wherein the seat is further arranged to notify the CTI to set the state of the seat being in service after accepting the session call access request; and the CTI is further arranged to refuse other access requests of accessing the seat when the state of the seat is in service.

5. The system according to claim 1, wherein the CTI is further arranged to return, when determining that the user obtains a service authorization according to the received instant messaging queuing information, the queuing result information to the Web access device and send the Web access service beginning message to the seat; and the seat is further arranged to receive the instant messaging request initiated by the Web access device, compare the instant messaging request with the Web access service beginning message sent by the CTI, if it is indicated that the instant messaging request is a legitimate message by comparison, accept the instant messaging request and perform the instant messaging; otherwise, return a rejection message.

6. The system according to claim 2, wherein the CTI is further arranged to return, when determining that the user obtains a service authorization according to the received instant messaging queuing information, the queuing result information to the Web access device and send the Web access service beginning message to the seat; and the seat is further arranged to receive the instant messaging request initiated by the Web access device, compare the instant messaging request with the Web access service beginning message sent by the CTI, if it is indicated that the instant messaging request is a legitimate message by comparison, accept the instant messaging request and perform the instant messaging; otherwise, return a rejection message.

7. A call service implementation method, comprising:

a Web access device logging on an instant messaging server based on an instant messaging access operation of a user and sending instant messaging queuing information to a Computer Telephony Integration (CTI);

the CTI returning queuing result information to the Web access device according to the received instant messaging queuing information and sending a Web access service beginning message to a seat;

the Web access device initiating an instant messaging request to the seat according to the received queuing result information;

the network queuing device forwarding the message between the Web access device and the CTI, wherein the message comprises the instant messaging queuing information and the queuing result information;

the seat accepting the instant messaging request according to the Web access service beginning message, performing an instant messaging, and initiating extended services supported by the instant messaging server, the extended services including video chat, video conference, white board, application program share and remote assistance.

8. The method according to claim 7, wherein the instant messaging queuing information comprises an instant messaging account of the user and/or seat skills required;

the queuing result information comprises information of an instant messaging account allocated to the seat by the CTI according to the received instant messaging queuing information; and the Web access service beginning message comprises an instant messaging account of the user.

9. The method according to claim 7, wherein the step that the CTI sends the Web access service beginning message to the seat comprises: the CTI, when determining that the user obtains a service authorization according to the received instant messaging queuing information, returns the queuing result information to the Web access device and sends the Web access service beginning message to the seat; and the step that the seat accepts the instant messaging request and performs the instant messaging comprises: the seat receives the instant messaging request initiated by the Web access device, compares the instant messaging request with the Web access service beginning message sent by the CTI, if it is indicated that the instant messaging request is a legitimate message by comparison, accepts the instant messaging request and performs the instant messaging; and the method further comprising: if it is indicated that the instant messaging request is not a legitimate message by comparison, the seat returns a rejection message.

10. The method according to claim 7, further comprising the seat notifying the CTI to set the state of the seat being in service after accepting the instant messaging request; the CTI refusing other access requests of accessing the seat.

11. The method according to claim 8, wherein the step that the CTI sends the Web access service beginning message to the seat comprises: the CTI, when determining that the user obtains a service authorization according to the received instant messaging queuing information, returns the queuing result information to the Web access device and sends the Web access service beginning message to the seat; and the step that the seat accepts the instant messaging request and performs the instant messaging comprises: the seat receives the instant messaging request initiated by the Web access device, compares the instant messaging request with the Web access service beginning message sent by the CTI, if it is indicated that the instant messaging request is a legitimate message by comparison, accepts the instant messaging request and performs the instant messaging; and the method further comprising: if it is indicated that the instant messaging request is not a legitimate message by comparison, the seat returns a rejection message.

* * * * *